United States Patent Office 3,808,210
Patented Apr. 30, 1974

3,808,210
NAPHTHYLOXY HYDROXYPROPYLAMINO-
ALKYL PIPERAZINES
Gilbert Regnier, Chatenay Malabry, Roger Canevari, Clamart, and Michel Laubie, Vaucresson, France, assignors to Societe en nom Collectif Science Union et Cie Societe Francaise de Recherche Medical-Suresnes
No Drawing. Filed Sept. 9, 1971, Ser. No. 179,172
Claims priority, application Great Britain, Sept. 15, 1970, 44,008/70
Int. Cl. C07d 51/42
U.S. Cl. 260—256.4 N    2 Claims

ABSTRACT OF THE DISCLOSURE

There are provided hydroxypropylaminoalkyl piperazines of the formula:

$$R-OCH_2-CHOH-CH_2-NH-CH(CH_3)-(CH_2)_n-N\underset{}{\underbrace{\phantom{XXX}}}N-Het$$

wherein R is lower-alkylphenyl, lower-alkoxyphenyl, lower-alkenyloxyphenyl, cyanophenyl, nitrophenyl, acetamidophenyl, α-naphthyl or 4-indolyl, n is 1 or 2 and Het is pyridyl, pyrimidinyl, pyridazinyl, pyrazinyl, triazinyl, thiazolyl or thiadiazolyl, which possess cardiovascular properties.

---

The present invention provides hydroxyethylaminoalkyl piperazines of the General Formula I:

$$R-OCH_2-CHOH-CH_2-NH-\underset{CH_3}{\underset{|}{CH}}-(CH_2)_n-N\underset{}{\underbrace{\phantom{XXX}}}N-Het \quad (I)$$

wherein:
R is selected from the group consisting of:
  (a) a radical of the General Formula II:

$$R'\text{—}\bigcirc \quad (II)$$

wherein R' is selected from the group consisting of lower alkyl, lower alkoxy, each containing from 1 to 4 carbon atoms inclusive and lower alkenyloxy radicals, each containing from two to four carbon atoms inclusive, cyano, nitro and acetamido radicals; and
  (b) a radical of the general formula:

(III)    (IV)

n is selected from the numbers 1 and 2, and
Het is selected from 5 and 6 membered heterocyclic radicals containing from 1 to 3 nitrogen atoms and optionally one sulfur atom, consisting of: pyridyl, pyrimidinyl, pyridazinyl, pyrazinyl, triazinyl, thiazolyl and thiadiazolyl radicals, and these radicals mono- and polysubstituted by a substituent selected from the group consisting of lower alkyl and lower alkoxy radicals each containing from 1 to 4 carbon atoms inclusive;
and salts thereof.

The compounds of the present invention are new and are prepared by condensing an epoxy compound of the General Formula V:

$$R.\underset{H}{\underset{|}{C}}\underset{\diagdown O \diagup}{\phantom{X}}CH_2 \quad (V)$$

or a halohydrin of the General Formula VI:

$$R.\underset{H}{\underset{|}{C}}-CH_2X \atop OH \quad (VI)$$

wherein X represents a chlorine or bromine atom, and R has the meanings given above, with a primary amine of the General Formula VII $$H_2N-\underset{CH_3}{\underset{|}{CH}}-(CH_2)_n-N\underset{}{\underbrace{\phantom{XXX}}}N-Het \quad (VII)$$

in which Het and n have the meanings given above.

The process according to the present invention is advantageously carried out by heating the epoxy Compound V or the halohydrin VI with a slight excess of the corresponding amine VII at a temperature preferably within the range from 100° C. to 150° C. If desired, the reaction may be carried out in the presence of a polar solvent, for example a tertiary aliphatic amide, for example, dimethylformamide.

When a halohydrin VI is used, the condensation involves the intermediate formation of the corresponding epoxy Compound V and the excess of amine used acts as an acceptor of the hydracid formed.

On completion of the reaction, if desired after evaporation of the reaction medium, the product may be crystallized from, for example, a hydrocarbon of low molecular weight, an aliphatic ether or the residue may be extracted, for example, by distribution between an aqueous mineral acid and an organic solvent immiscible with water, subsequently making the aqueous acid phase alkaline, and extracting the liberated basic products in a suitable solvent. After evaporation of the solvent, the base may then be crystallized or purified by, for example, chromatographic absorption.

The molecule of the new compounds of the Formula I contains 2 asymmetric carbon atoms so that they exist in optically active or racemic threo or erythro forms, and it is to be understood that, although in this specification reference is made to the single Formula I, all the optically active forms are included within the scope of the present invention.

The compounds of the present invention are weak bases which may be transformed with acids into acid addition salts. As acids used to form these salts there may be especially mentioned, for example, mineral acids, for example hydrochloric, hydrobromic, sulfuric and phosphoric acids, and organic acids, for example acetic, propionic, maleic, fumaric, tartaric, citric, oxalic, benzoic, methanesulphonic and isethonic acids.

The following examples illustrate the invention.

EXAMPLE 1

3-{3-[4-(2-pyridyl)-1-piperazinyl]-2-propyl}-amino-1-α-naphthyloxy-2-propanol

A mixture of 4 g. of 3-α-naphthyloxy-1,2-epoxy-propane and 5 g. of 1-(2-amino-2-methyl-ethyl)-4-(2-pyridyl)-piperazine (B.P. 138–140° C. under 0.5 mm. Hg pressure) is boiled for 6 hours at 115° C. The viscous mixture is then taken up in 100 ml. of a normal solution of methanesulphonic acid, this solution is washed with ether, then alkalinized with a dilute sodium hydroxide solution in the presence of chloroform. The chloroform solution is decanted, the alkaline solution is once more extracted with chloroform, the organic extracts are washed with water and the solvent is then evaporated under reduced pressure. The oily residue thus obtained is dissolved in 5 ml. of methanol at the boil. Then 150 ml. of ether are added and the batch is allowed to crystallize in an ice bath, to furnish 3 g. of crystals which are recrystallized from 75 ml. of cyclohexane. Finally, there are obtained 2 g. of 3-{3-[4-(2-pyridyl)-1-piperazinyl]-2-propyl} - amino - 1 - α-naphthyloxy-2-propanol, crystals which melt at 110° C. on a Kofler heater.

The 1 - (2-amino-2-methyl ethyl)-4-(2-pyridyl)-piperazine used as starting material may be prepared by reducing 1-(2-oximino propyl) - 4 - (2-pyridyl)-piperazine, melting at 150° C. on a Kofler heater, with lithium-aluminum hydride in tetrahydrofuran; this oximino compound itself is obtained from 1-acetonyl-4-(2-pyridyl)-piperazine, B.P. 145–150° C. under 0.5 mm. Hg pressure, and this compound in turn is obtained by the reaction of chloracetone on an excess of 1-(2-pyridyl)-piperazine in anhydrous toluene.

EXAMPLES 2–4

The following compounds were prepared by the process described in Example 1:

(2) 3-{3-[4-(2-thiazolyl) - 1 - piperazinyl]-2-propyl}-amino-1-α-naphthyloxy-2-propanol; M.P. (Kofler) 109–110° C. (benzene/cyclohexane), starting from 1-(2-amino-2-methyl ether) - 4 - (2 - thiazolyl)-piperazine, M.P. (Kofler) 65° C. and 3-α-naphthyloxy-1,2-epoxy propane.

(3) 3-{3-[4-(2-pyrimidinyl)-1 piperazinyl]-2-propyl}-amino-1 (4-cyano phenoxy)-2-propanol; M.P. (Kofler) 129° C. (benzene), starting from 1-(2-amino-2-methyl ethyl)-4-(2-pyrimidinyl)-piperazine (B.P. 149–152° C. under 0.35 mm. Hg pressure), and 3-(4-cyano phenoxy)-1,2-epoxy propane.

(4) 3-{3-[4-(2-pyrimidinyl)-1-piperazinyl] - 2 - propyl}-amino-1-(2-methoxyphenoxy)-2-propanol, M.P. 131° C. (benzene/cyclohexane), starting from the amine used in Example 3 and 3-(2-methoxyphenoxy)-1,2-epoxy propane.

EXAMPLE 5

3-{3-[4-(2-pyrimidinyl)-1-piperazinyl]-2-propyl}-amino-1-α-naphthyloxy-2-propanol

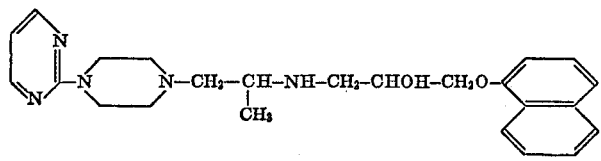

As described in Example 1, a mixture of 34 g. of 3-α-naphthyloxy-1,2-epoxypropane and 40 g. of 1-(2-amino-2-methyl ethyl)-4-(2 - pyrimidinyl)-piperazine, B.P. 149–152° C. under 0.4 mm. Hg pressure, is heated for 7 hours at 140° C. On completion of this heat treatment the reaction mixture is treated as described in Example 1, and the resulting oily residue (60 g.) is dissolved in 100 ml. of methanol. Then 30 g. of oxalic acid dissolved in 100 ml. of methanol are added to the solution obtained. Yield: 29 g. of crystalline oxalate melting at 176° C. on a Kofler heater. This oxalate is treated with 300 ml. of a 10% sodium hydroxide solution, the liberated base is extracted with benzene and the solvent is evaporated, to leave 21 g. of a yellow oil which is crystallized from 50 ml. of ether. Finally, after recrystallization from ethanol there result 5 g. of 3-{3-[4-(2-pyrimidinyl)-1 piperazinyl]-2-propyl}-amino-1-α-naphthyloxy-2-propanol, white crystals melting at 139° C. on a Kofler heater.

The 1-(2-amino-2 methyl ethyl)-4-(2-pyrimidinyl)-piperazine used as starting material is obtained by hydrolyzing 1(p-nitrobenzamido-isopropyl)-4-(2 - pyrimidinyl)-piperazine, melting at 168° C. on a Kofler heater, in HCl of 50% strength; this amide is itself obtained by the reaction of para-nitrobenzoylpropyleneimide upon 1-(2-pyrimidinyl)-piperazine.

EXAMPLES 6–8

The following derivatives were prepared by the process described in Example 5:

(6) 3-{3-[4-(6-methoxy-2 - pyridyl) - 1 - piperazinyl]-2-propyl}-amino-1-α-naphthyloxy-2-propanol, M.P. (capillary) of its trihydrochloride: 123–133° C. (ethanol), starting from 1-(2-amino-2-methyl ethyl)-4-(6-methoxy-2-pyridyl)-piperazine, boiling at 145–148° C. under 0.3 mm. Hg pressure, and 3 - α - naphthyloxy - 1,2 - epoxy propane.

(7) 3-{3-[4-(2-pyrimidinyl)-1 - piperazinyl] - 2 - propyl}-amino-1 - (2 - cyanophenoxy) - 2 - propanol, M.P. (Kofler) 107° C. (ether), starting from the amine of Example 5 and 3-(2-cyanophenoxy)-1,2-epoxy propane.

(8) 3-{3-[4-(2-pyrimidinyl)-1 piperazinyl] - 2 - propyl}-amino-1-(4-nitrophenoxy)-2-propanol, M.P. (Kofler) 138° C. (benzene), starting from the amine of Example 5 and 3-(4-nitrophenoxy)-1,2-epoxy propane.

(9) 3-{4-[4-(3-pyridazinyl)-1-piperazinyl] - 3 - butyl}-amino-1-(3-methylphenoxy)-2-propanol, starting from 1-(3-amino-3-methyl-propyl)-4-(3-pyridazinyl) - piperazine and 3-(3-methylphenoxy)-1,2-epoxy propane.

(10) 3-{3-[4-(2-pyrazinyl)-1-piperazinyl]-2 - propyl}-amino-1-(4-indolyloxy)-2-propanol, starting from 1 - (2-amino-2-methyl ethyl)-4-(2-pyrazinyl) piperazine and 3-(4-indolyloxy)-1,2-epoxy propane.

(11) 3-{3-[4-(1,3,5-triazin-2-yl) - 1 - piperazinyl] - 2-propyl}-amino-1-(4-acetamido-phenoxy) - 2 - propanol, starting from 1-(2-amino-2-methyl-ethyl)-4 - (1,3,5 - triazin-2-yl)-piperazine and 3-(4-acetamidophenoxy) - 1,2-epoxy propane.

(12) 3-{3-[4-(1,3,4-thiadiazol-2-yl)-1-piperazinyl] - 2-propyl}-amino-1-(2-allyloxyphenoxy)-2-propanol, starting from 1-(2-amino-2-methyl-ethyl) - 4 - (1,3,4 - thiadiazol-2-yl)-piperazine and 3-(2-allyloxyphenoxy) - 1,2 - epoxy propane.

The compounds of the General Formula I and their physiologically tolerable salts possess valuable pharmacological and therapeutic properties, especially cardiovascular, β-adrenergic receptor blocker properties.

The toxicity was studied in mice. It was found that the $LD_{50}$ is between 100 and 300 mg./kg. by intraperitoneal administration.

The β-adrenergic receptors inhibiting activity was studied on the isolated auricle of the guinea-pig and on the anesthetized dog.

It was observed in these experimentation that the new compounds administered at doses of 0.5 to 1 mg./kg. intravenously inhibit partially or totally the tachycardic and hypertensive effect of adrenaline and isoprenaline. The duration of this activity may be in some cases superior to 4 hours.

These properties of the new compounds justify their use in therapy, especially in the treatment of cardiac rythm disorders, hypertension and angina pectoris.

The present invention also provides pharmaceutical compositions containing a compound of General Formula I or a physiologically tolerable salt thereof, in admixture or conjunction with a pharmaceutically suitable carrier such as, for example, distilled water, glucose, lactose, starch, talc, gum arabic, magnesium stearate, ethylcellulose or cocoa butter.

The doses may vary from 0.1 to 1 mg./kg. and may be administered by oral, rectal or parenteral route in various pharmaceutical forms such, for example, as tablets, dragées, capsules, suppositories and drinkable or injectable solutions from 1 to 5 times a day.

What we claim is:
1. A compound having the formula

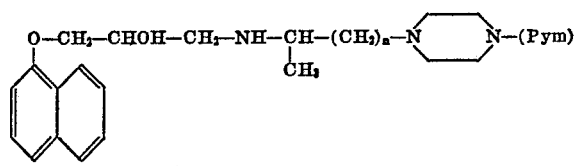

wherein:
n is selected from 1 and 2 and (Pym) is pyrimidinyl.
and
physiologically tolerable acid addition salts thereof.

2. A compound of claim 1 which is 3-{3-[4-(2-pyrimidinyl)-1-piperazinyl]-2-propyl}-amino-1-α - naphthyloxy-2-propanol.

References Cited
UNITED STATES PATENTS 3,299,067  1/1967  Regnier et al. _____ 260—256.4
3,331,843  7/1967  Tomcufcik et al. _____ 260—268

DONALD G. DAUS, Primary Examiner

R. V. RUSH, Assistant Examiner

U.S. Cl. X.R.

260—249.5, 250 R, 250 A, 268 BC, 268 H; 424—249, 250, 251